(No Model.)
T. M. PUSEY.
RHEOSTAT.
No. 590,910. Patented Sept. 28, 1897.
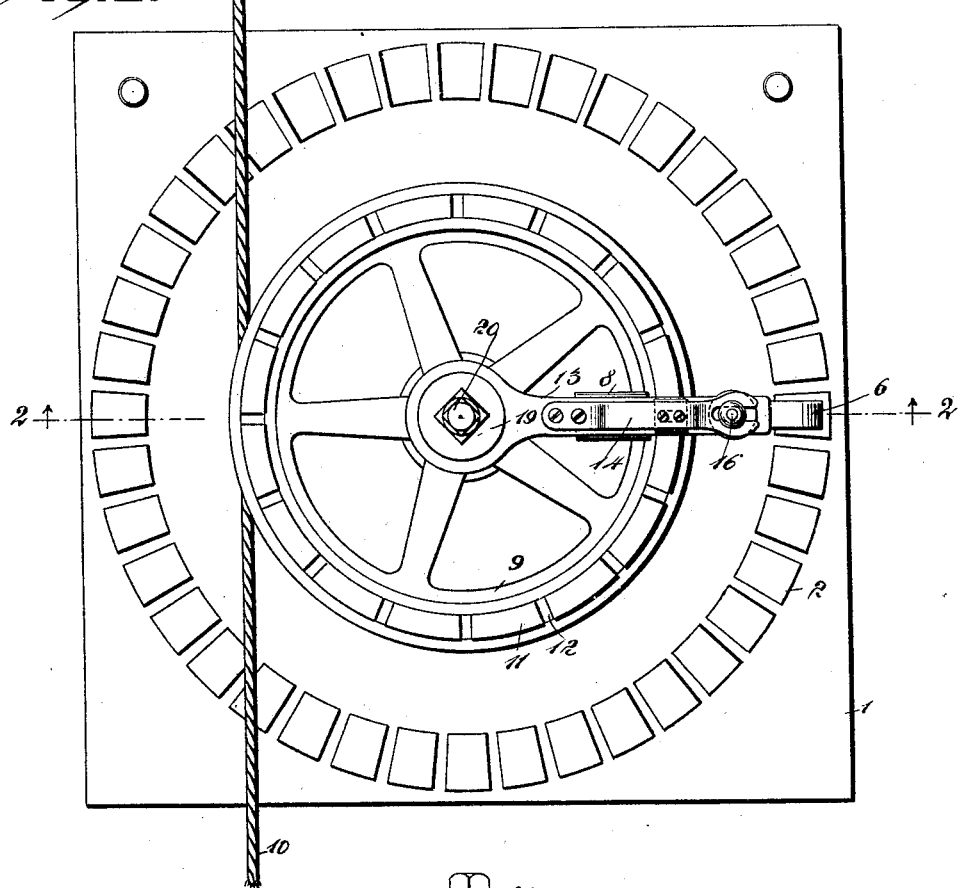
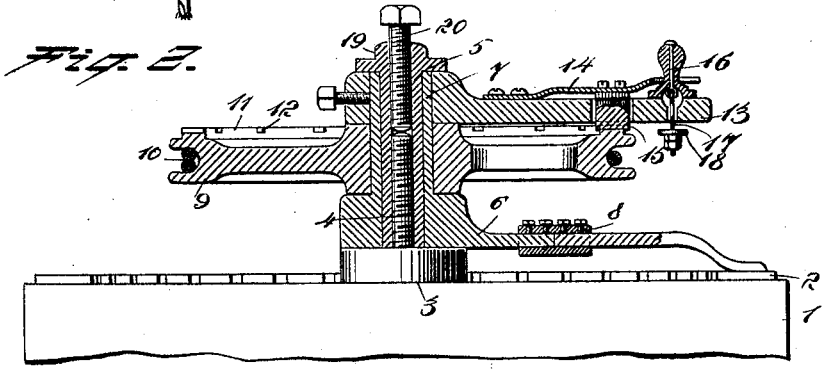
WITNESSES:
Henry T. Hirsch.
C. R. Ferguson
INVENTOR
T. M. Pusey
BY
ATTORNEYS.
THE NORRIS PETERS CO., PHOTO-LITHO., WASHINGTON, D. C.

UNITED STATES PATENT OFFICE.

THOMAS M. PUSEY, OF KENNETT SQUARE, PENNSYLVANIA.

RHEOSTAT.

SPECIFICATION forming part of Letters Patent No. 590,910, dated September 28, 1897.

Application filed February 3, 1897. Serial No. 621,875. (No model.)

*To all whom it may concern:*

Be it known that I, THOMAS M. PUSEY, of Kennett Square, in the county of Chester and State of Pennsylvania, have invented a new and Improved Rheostat, of which the following is a full, clear, and exact description.

This invention relates to rheostats for use in connection with voltage-regulators for dynamos, and it is particularly adapted for use in connection with the regulator shown in the United States Patent No. 574,217, granted to me December 29, 1896; and a main object is to provide a rheostat of simple construction in which the contact-arm may be moved with a wheel to which motion is imparted by a regulator, and also to so construct the parts that said contact-arm may be moved independently of the wheel.

I will describe a rheostat embodying my invention and then point out the novel features in the appended claims.

Reference is to be had to the accompanying drawings, forming a part of this specification, in which similar characters of reference indicate corresponding parts in both views.

Figure 1 is a plan view of a rheostat embodying my invention, and Fig. 2 is a section on the line 2 2 of Fig. 1.

The rheostat comprises a base 1, upon which is placed a circular row of contact-plates 2 in the usual manner. Extended from a central hub 3 on the base 1 is a threaded bolt 4, and engaged with this threaded bolt 4 is an interiorly-threaded sleeve 5.

Mounted to rotate on the sleeve 5 is a contact-arm 6. As here shown, this contact-arm has a sleeve portion 7 engaging around the sleeve 5, and for the purpose of adjusting the length of the arm 6 I form it in two pieces, the outer and inner sections having their adjacent ends seated in a collar 8, through which clamping-bolts extend to impinge upon said sections of the arm. The outer end of the arm, of course, is curved downward to contact with the plates 2.

Mounted on the sleeve 7 of the arm 6 is a wheel 9, having a peripheral groove in which a rope 10 is designed to engage. One end of said rope, as shown in the patent referred to, is intended to be attached to an automatic regulator and the other end is to be supplied with a weight. On one side the wheel 9 is provided with an annular flange 11, having a series of notches 12. Keyed to the sleeve 7 at the outer side of the wheel 9 is a setting-arm 13. Secured to the setting-arm 13 is a spring-plate 14, which has attached to it a dog 15, passing through an opening in the arm 13 and designed to engage in either one of the notches 12. The outer end of the spring-plate 14 is slotted or provided with two forwardly-extended fingers which embrace opposite sides of a rocking finger-piece 16 at the end of the arm 13. This finger-piece 16 has a swinging connection with a rod 17, which extends loosely through a hole in the arm 13, and is provided at its lower end with a stop-ring 18. This rod 17 is of sufficient length to sustain the ring 18 a short distance below the arm 13.

The sleeve 5 is provided at its outer end with a flange 19, designed to engage upon the end of the sleeve 7 and upon the outer surface of the arm 13 to prevent outward movement of the parts relatively to the sleeve 7. The sleeve 5 will have an angular head with which a wrench or similar tool may be engaged, and a set-bolt 20 extends into the sleeve 5 and impinges against the threaded bolt 4.

In operation the resistance-plates 2 will be in connection with one wire of an electric line and the central hub 3 will be in connection with the other wire. Upon change in voltage in a dynamo motion will be imparted to the wheel 9 by the regulator referred to, and as this wheel 9 has connection with the arm 13 through the medium of the dog 15 it is obvious that the contact-arm 6 will be moved over the plates 2. When it is desired to set the arm 6 in either direction without imparting motion to the wheel 9, a lateral pull on the finger-piece 16 will rock said finger-piece and cause it to move the plate 14 upward to disengage the dog 15 from a notch 12. Then of course the arm 13 may be rotated to move the arm 6 to any desired position.

Having thus described my invention, I claim as new and desire to secure by Letters Patent—

1. A rheostat, comprising a circular row of contact-plates, a bolt extended from the base of the rheostat, a sleeve removably attached to said bolt, a contact-arm mounted to rotate on the sleeve, a sleeve on said contact-arm surrounding the first-named sleeve, a peripherally-grooved wheel mounted to rotate on the second-named sleeve, an arm attached to said second-named sleeve at the outer side of the wheel, a spring-actuated dog carried by said arm and adapted to engage in any one of a series of notches formed on the outer surface of the wheel, and means for drawing said dog out of engagement with the notch as said arm is rotated relatively to the wheel, substantially as specified.

2. A rheostat, comprising a base, a series of contact-plates arranged thereon, a threaded rod extended from the center of said base, an interiorly-threaded sleeve engaging the said rod, a contact-arm mounted to rotate on said sleeve, the said contact-arm consisting of two sections removably clamped together, a peripherally-grooved wheel mounted to rotate on a sleeve extended from the hub of the contact-arm, the said sleeve surrounding the first-named sleeve, a setting-arm attached to the sleeve extended from the hub of the contact-arm at the outer side of the grooved wheel, a spring-plate attached to said setting-arm, a dog attached to the spring-plate and extended through an opening in the arm, to engage in any one of a series of notches formed in the outer surface of the grooved wheel, and a rocking finger on the setting-arm, engaged by the forwardly-extended portion of the spring-plate, substantially as specified.

THOMAS M. PUSEY.

Witnesses:
HOWARD H. POLK,
A. T. JACKSON.